United States Patent
Chanclou

(10) Patent No.: US 12,550,112 B2
(45) Date of Patent: Feb. 10, 2026

(54) DELAY COMPENSATION FOR A GEOLOCATION MEASUREMENT WITH UPLINK REFERENCE SIGNALS

(71) Applicant: ORANGE, Issy-les-Moulineaux (FR)

(72) Inventor: Philippe Chanclou, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 312 days.

(21) Appl. No.: 18/262,297

(22) PCT Filed: Jan. 21, 2022

(86) PCT No.: PCT/FR2022/050116
§ 371 (c)(1),
(2) Date: Jul. 20, 2023

(87) PCT Pub. No.: WO2022/157461
PCT Pub. Date: Jul. 28, 2022

(65) Prior Publication Data
US 2024/0137905 A1  Apr. 25, 2024
US 2024/0236932 A9  Jul. 11, 2024

(30) Foreign Application Priority Data
Jan. 22, 2021  (FR) ...................... 2100630

(51) Int. Cl.
*H04W 64/00* (2009.01)
*H04L 5/00* (2006.01)
*H04W 56/00* (2009.01)

(52) U.S. Cl.
CPC ......... *H04W 64/006* (2013.01); *H04L 5/0051* (2013.01); *H04W 56/0065* (2013.01)

(58) Field of Classification Search
CPC .. G01S 2205/008; G01S 5/02216; G01S 5/06; H04L 5/0051; H04W 56/0065; H04W 64/006
See application file for complete search history.

(56) References Cited

U.S. PATENT DOCUMENTS

| 6,356,763 B1 | 3/2002 | Kangas et al. |
| 2015/0087329 A1* | 3/2015 | Stratford ............... G01S 5/0252 455/456.1 |

(Continued)

OTHER PUBLICATIONS

International Search Report dated May 27, 2022 for corresponding International Application No. PCT/FR2022/050117, filed Jan. 21, 2022.

(Continued)

*Primary Examiner* — Nguyen T Vo
(74) *Attorney, Agent, or Firm* — David D. Brush; Westman, Champlin & Koehler, P.A.

(57) ABSTRACT

A method for receiving an uplink reference signal sent by a mobile terminal to a network entity through a radio unit connected to an antenna, and used to geolocate the mobile terminal. The method is implemented by the network entity and includes: recording, by way of time of arrival of the reference signal, a time obtained by adding a delay, called a waiting delay, to the time at which the reference signal was sent by the radio unit, the waiting delay being larger in value than a transmit path time of a comparison signal, between the radio unit and the network entity; and sending a message to a geolocation server, including information relating to the recorded time of arrival.

10 Claims, 3 Drawing Sheets

(56) References Cited

U.S. PATENT DOCUMENTS

Figure 1:
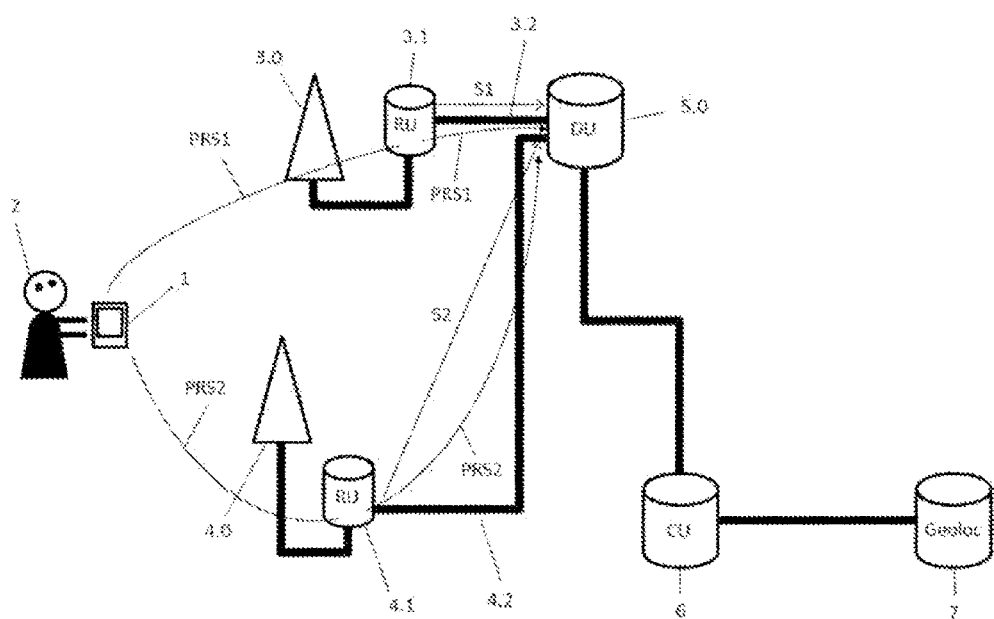

| | | | |
|---|---|---|---|
| 2015/0133110 A1 | 5/2015 | Siomina et al. | |
| 2019/0327706 A1 | 10/2019 | Agnihotri et al. | |
| 2020/0112498 A1* | 4/2020 | Manolakos | H04J 13/0062 |
| 2022/0006589 A1* | 1/2022 | Dwivedi | G01S 1/0428 |

OTHER PUBLICATIONS

Written Opinion of the International Searching Authority dated May 27, 2022 for corresponding International Application No. PCT/FR2022/050117, filed Jan. 21, 2022.

International Search Report dated May 12, 2022 for corresponding International Application No. PCT/FR2022/050116, filed Jan. 21, 2022.

Written Opinion of the International Searching Authority dated May 12, 2022 for corresponding International Application No. PCT/FR2022/050116, filed Jan. 21, 2022.

English translation of the Written Opinion of the International Searching Authority dated May 27, 2022 for corresponding International Application No. PCT/FR2022/050117, filed Jan. 21, 2022.

English translation of the Written Opinion of the International Searching Authority dated May 12, 2022 for corresponding International Application No. PCT/FR2022/050116, filed Jan. 21, 2022.

Nokia et al., "Architecture impacts for UL-TDOA positioning", vol. RAN WG2, No. Xian, China; Apr. 8, 2019-Apr. 12, 2019, Apr. 6, 2019 (Apr. 6, 2019), 3GPP Draft; R2-1904866 UL-TDOA Architecture, 3rd Generation Partnership Project (3GPP), Mobile Competence Centre ; 650, Route Des Lucioles ; F-06921 Sophia-Antipolis Cedex ; France, Retrieved from the Internet: URL:http://www.3gpp.org/ftp/Meetings%5F3GPP%5FSYNC/RAN2/Docs/R2%2D1904866%2Ezip, XP051702145.

Ruffini Stefano et al, "5G Synchronization Requirements and Solutions", SE No. Jan. 2021, ISSN:0014-0171, Jan. 13, 2021 (Jan. 13, 2021), p. 1-13, Ericsson Review (Incl. On) Retrieved from the Internet: URL:https://www.ericsson.com/48e592/assets/local/reports-papers/ericsson-technology-review/docs/2021/5g-synchronization-requirements-and-solutions.pdf, XP055845957.

Pizzinat Anna et al., "Things You Should Know About Fronthaul", Mar. 1, 2015 (Mar. 1, 2015), vol. 33, No. 5, p. 1077-1083, XP011575192.

Anil Umesh et al., "Overview of O-RAN Fronthaul Specifications", NTT Docomo Technical Journal, Jul. 31, 2019 (Jul. 31, 2019), p. 46-59, XP055802879.

Non-Final Office Action for U.S. Appl. No. 18/262,293, mailed Jul. 25, 2025, 35 pages.

Fischer, S., "Observed time difference of arrival (OTDOA) positioning in 3GPP LTE," Qualcomm White Pap, 1(1), 1-62 (Year: 2014).

\* cited by examiner

DELAY COMPENSATION FOR A GEOLOCATION MEASUREMENT WITH UPLINK REFERENCE SIGNALS

1. CROSS REFERENCE TO RELATED APPLICATIONS

This application is a Section 371 National Stage Application of International Application No. PCT/FR2022/050116, filed Jan. 21, 2022, the content of which is incorporated herein by reference in its entirety, and published as WO 2022157461 on Jul. 28, 2022, not in English.

2. FIELD OF THE INVENTION

The present invention relates to the field of geolocation of mobile terminals, and for example to geolocation by means of a triangularization technique via antennas close to a mobile terminal.

3. PRIOR ART

The present invention is especially applicable to computation of the distance between a transmitter and a mobile terminal via estimation of times of arrival or differences in times of arrival.

For example, these estimations may be made as a result of the mobile equipment sending location signals according to the method called Uplink Time Difference of Arrival (U-TDOA). Location is determined in two steps. Initially, the time differences are estimated. The mobile equipment sends an uplink signal that arrives at different times at each of the base stations, these consisting of a radio unit (RU), a distributed unit (DU) and a centralized unit (CU) of the radio access network (RAN). A central server gathers these various signals from the base stations and determines the time difference of arrival between the signals. These time differences are estimated by subtracting from each other the times of arrival (TOA) at each of the base stations.

Both in the case where measurement is carried out based on reference signals sent by the DUs to the mobile terminal, i.e. on downlink signals, and in the case where measurement is carried out based on reference signals sent by the mobile terminal to the DUs, i.e. on uplink signals as described above, to make it possible to precisely estimate geolocation by means of the times of arrival or time differences of arrival, it is necessary to know the trip time of reference signals between the one or more antennas and the mobile terminal.

These trip times of transmission of the reference signals between the antennas (or RUs which are located in proximity to the antennas, this not necessarily being the case for the DUs) and the mobile terminal may be deduced from the trip time between the mobile terminal and the DU, i.e. the time taken by the reference signal sent by the UE to travel the path between the mobile terminal/DUs, since the time taken by the reference signals to travel the path between the RU/DU is considered to be negligible. Specifically, current geolocation techniques were designed at a time when the functions performed by equipment of the DU and RU type were grouped together in a single piece of equipment or at least co-located in proximity to the antenna.

However, equipment of the DU type and of the RU type tends to be increasingly separated by distances that may vary from a few meters to several tens of kilometers. The trip time between this equipment is no longer negligible and corrupts geolocation measurements. One of the aims of the invention is to remedy these drawbacks of the prior art.

4. SUMMARY OF THE INVENTION

The invention improves the situation with the aid of a method for receiving an uplink reference signal sent by a mobile terminal to a network entity through a radio unit connected to an antenna, said signal being used for geolocation of the mobile terminal, the method being implemented by the network entity and comprising:
  recording, as the time of arrival of the reference signal, a time obtained by adding a delay, referred to as the time delay, to the time at which the reference signal was sent by the radio unit, the time delay being of a value greater than a trip time of transmission of a signal, referred to as the comparison signal, between the radio unit and the network entity, and
  sending, to a geolocation server, a message containing information relating to the recorded time of arrival.

Contrary to the prior art, it is not the actual time of arrival of the reference signal that is recorded, but a fictitious time of arrival computed to compensate for inaccuracies due to the non-air part of the trip of the reference signal. Thus, whatever the actual trip time of a signal between the radio unit and the network entity, which is of a duration that depends on the distance traveled and on time-varying transmission conditions, it is possible to deduce the trip time of this signal between the mobile terminal and the antenna of the radio unit, i.e. the trip time over the air (also called the time of flight), simply by knowing the value of the delay and the total fictitious trip time between the mobile terminal and the network entity. Specifically, it is the trip times over the air of the reference signals, also called their times of flight, between a plurality of antennas and a mobile terminal, that allows its position with respect to these antennas to be accurately computed. Advantageously, by virtue of the proposed method, the portion of the trip time downstream of an antenna is extended by a fictitious value equal to the delay, and is therefore constant regardless of the distance traveled and the transmission conditions. By subtracting the time delay from the fictitious total trip time between the terminal and the network entity, the time of flight is obtained. All that remains is for the network entity to transmit to a geolocation server either this time of flight, or the difference between two of these times of flight if the entity receives two reference signals having passed through two different radio units. Thus, the proposed method compensates for transmission delays due to the non-air part of the trips of the reference signals used to determine the geolocation of a terminal.

The comparison signal may be any signal between the radio unit and the network entity, including the reference signal itself.

According to one aspect of the proposed method, it comprises measuring a value of the trip time of transmission of the comparison signal.

By virtue of this aspect, the network entity is able to verify that the delay is indeed greater than the trip time of a comparison signal, and to trigger a procedure for updating the value of the delay if this is not the case.

According to one aspect of the proposed method, the comparison signal is the reference signal.

By virtue of this aspect, no specific signal, other than the reference signal itself, is necessary for the proposed method.

According to one aspect of the proposed method, the comparison signal is a signal distinct from the reference signal.

By virtue of this aspect, the trip time of a comparison signal may be measured by the network entity prior to the processing of the reference signal, and independently thereof.

According to one aspect of the proposed method, it comprises sending, to the radio unit, a request for transmission of the comparison signal.

By virtue of this aspect, the network entity, or another entity further upstream, may receive a comparison signal that allows it to determine, for the delay, a value that is greater than the trip time of a comparison signal.

According to one aspect of the proposed method, it comprises receiving a message containing the value of the time delay.

In this mode, the network entity applies, to the reference signal, a delay that is set, and does not need to determine it itself. The value of the time delay may for example be delivered to the network entity by a centralized unit further upstream in the network.

According to one aspect of the proposed method, it comprises determining the value of the time delay depending on the measured value of the trip time of the comparison signal, and the message sent to a geolocation server contains the determined value of the time delay. In this embodiment, the network entity itself determines the delay that it applies to the reference signal. The network entity must then transmit the value of the delay to the entity responsible for the geolocation, so that it may correct the information that it receives in respect of the trip times of the reference signals.

According to one aspect of the proposed method, the message sent to a geolocation server comprises the recorded time of arrival.

By virtue of this aspect, the geolocation server receives information known in the art as TOA (Time Of Arrival) from all the network entities. The network entity does not compute differences between TOAs of reference signals, but sends, to the geolocation server, the fictitious times of arrival of these reference signals, and optionally the value or values of the time delays, so that the geolocation server may compute the times of flight of all the reference signals.

The various aspects of the method for receiving an uplink reference signal that have just been described may be implemented independently of one another or in combination with one another.

The invention also relates to a device for receiving an uplink reference signal sent by a mobile terminal to a network entity through a radio unit connected to an antenna, said signal being used for geolocation of the mobile terminal, the device being included in the network entity and comprising a receiver, a transmitter, a processor and a memory coupled to the processor with instructions intended to be executed by the processor to:
  record, as the time of arrival of the reference signal, a time obtained by adding a delay, referred to as the time delay, to the time at which the reference signal was sent by the radio unit, the time delay being of a value greater than a trip time of transmission of a signal, referred to as the comparison signal, between the radio unit and the network entity, and
  send, to a geolocation server, a message containing information relating to the recorded time of arrival.

This device, which is able to implement all of the embodiments of the method for receiving an uplink reference signal that has just been described, is intended to be implemented in a network entity of a base station of a cellular network, for example a network entity of the Distributed Unit (DU) type.

The invention also relates to a computer program comprising instructions that, when these instructions are executed by a processor, cause the latter to implement the steps of the method for receiving an uplink reference signal that has just been described.

The invention also relates to a data medium readable by a network entity of a base station of a cellular network, and comprising instructions of a computer program such as mentioned above.

The aforementioned program may use any programming language, and take the form of source code, object code, or of code intermediate between source code and object code, such as code in a partially compiled form, or in any other desirable form.

The aforementioned data medium may be any entity or device capable of storing the program. For example, a medium may include a storage means, such as a ROM, for example a CD-ROM or a microelectronic circuit ROM, or else a magnetic recording means. Such a storage means may be for example a hard disk, a flash memory, etc.

Moreover, a data medium may be a transmissible medium such as an electrical or optical signal, which may be routed via an electrical or optical cable, by radio or by other means. A program according to the invention may in particular be downloaded from a network such as the Internet.

Alternatively, a data medium may be an integrated circuit in which a program is incorporated, the circuit being designed to execute or to be used in the execution of the method in question.

5. PRESENTATION OF THE FIGS

Figure 2:
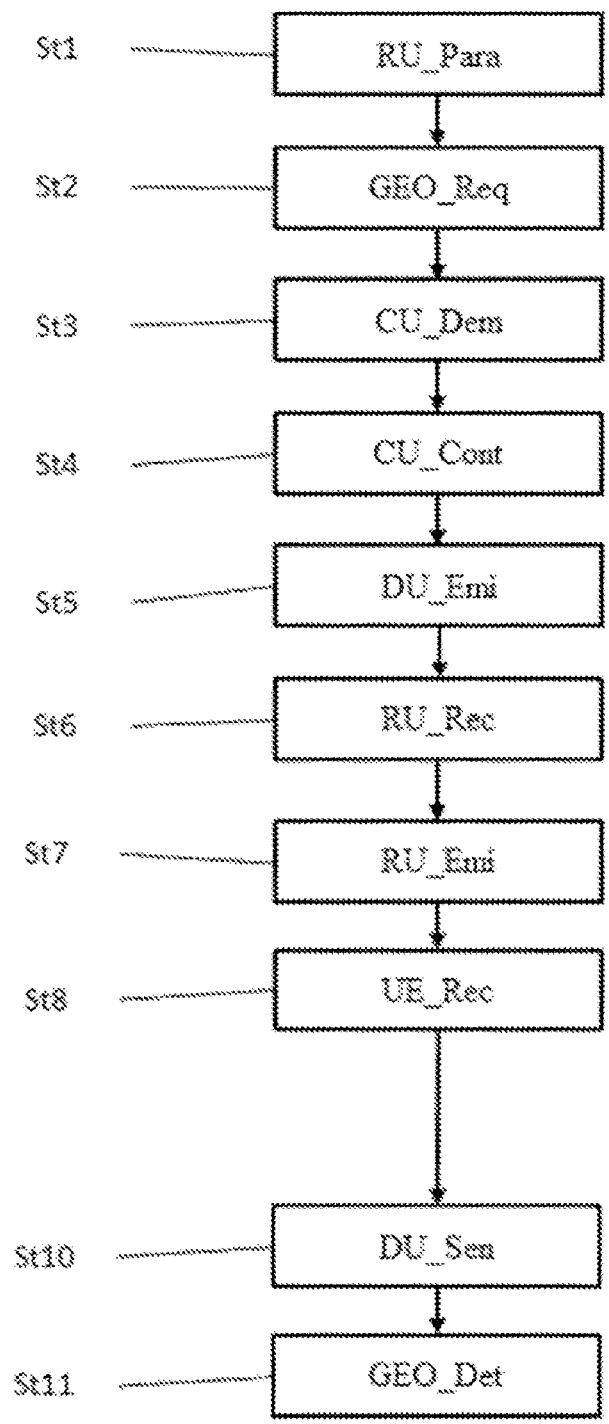
Figure 3:
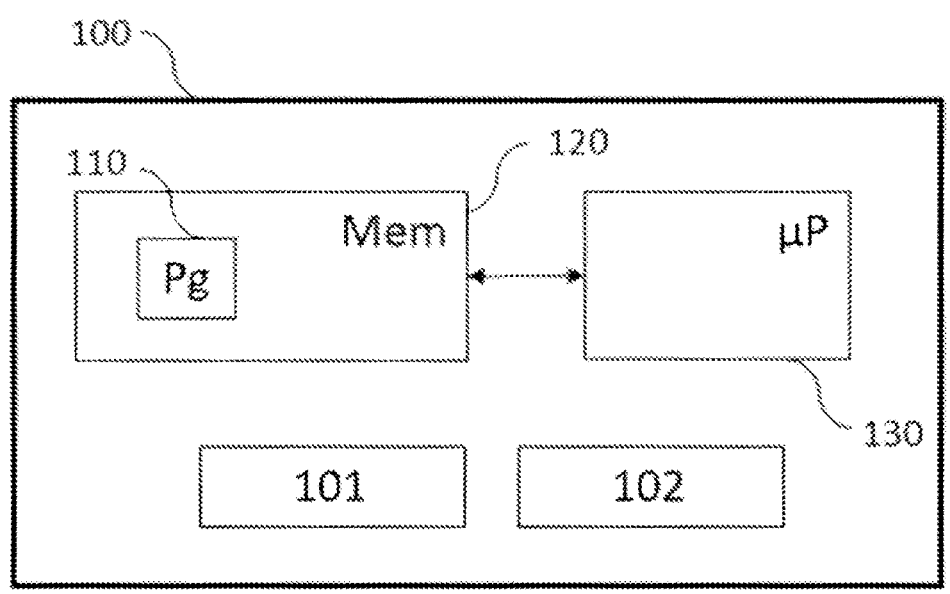

Other advantages and features of the invention will become more clearly apparent on reading the following description of one particular embodiment of the invention, which embodiment is given by way of simple illustrative and non-limiting example, and the appended drawings, in which:

FIG. 1 schematically shows a network entity, a radio unit and a mobile terminal according to one embodiment of the invention, FIG. 2 shows one example of implementation of the method for receiving an uplink reference signal, according to one embodiment of the invention, FIG. 3 shows one example of a structure of a device for receiving an uplink reference signal, according to one aspect of the invention.

6. DETAILED DESCRIPTION OF AT LEAST ONE EMBODIMENT OF THE INVENTION

By transmission conditions, what is meant is both conditions internal to the network (prioritization, resource allocation, routing path, buffering, channel coding, etc.) and conditions external to the network (schedule, temperature variation, substantial traffic fluctuation, electromagnetic interference, etc.). These transmission conditions impact the transmission time of signals to a more or less significant extent.

By signals used to estimate the position of a terminal, what is meant is the signals used to determine trip times between two points in the network, for example between a mobile terminal the position of which is to be determined and a network entity via a radio antenna or even a radio unit the position of which is known (for example, a signal that is intended to allow a measurement of a trip time of transmission between the network entity and the mobile terminal via the radio unit) or even between the network entity and the radio unit (for example, a signal that is intended to allow a measurement of a trip time of transmission over one portion of a communication network between the network entity and the radio unit). These signals may be reference signals. Thus, when the entity of the network is the one that transmits the signals and the mobile terminal the one that receives them, i.e. when a downlink is used, then the signals used may be positioning reference signals (PRS). These PRS sequences are particularly advantageous insofar as they have good autocorrelation properties and low cross-correlations, thus making it possible to precisely extract the PRS to measure its time of arrival.

By radio unit, what is meant is the radio transceiver that processes or produces the electrical signal transmitted to the antenna or received from the antenna and which corresponds to the radio signal transmitted or received by the antenna. Radio unit is the term used in the 5G standard, but this unit might also be referred to as the remote radio head (RRH) or even remote radio unit (RRU). This radio unit is distinct from the network entity.

By mobile terminal receiving radio signals from the radio unit, what is meant is that the terminal is able to at least partially decode the signals it receives from the radio unit. The mobile terminal may be connected to the base station corresponding to the radio unit. The network entity may be a distributed unit (this is the term employed in the 5G standard), also referred to as a digital unit or a base band unit (BBU). It may be included in a base station or even co-located with a centralized unit (CU). The network entity is connected to the radio unit by optical and/or microwave links, over distances varying from a few meters to several tens of kilometers. The network entity allows digital data sent to and from the radio unit, which receives and transmits this data in radio form, to be processed.

The trip time of transmission of a signal between the radio unit and the network entity may be measured using any known technique, in one direction or the other. When the network entity and the radio unit are synchronized, this being the case in the 5G standard, then the trip time of transmission may be measured by sending a signal comprising information relating to the time at which it was sent, and the receiver may then compare the time of arrival with the time at which the signal was sent. In the latter case, the trip time of transmission between the network entity and the radio unit may then be measured by the network entity when the radio unit sends the second signal or by the radio unit when the network entity sends the second signal. In the latter case, the radio unit may transmit this measurement to the network entity if necessary (each time the network entity uses this measurement and it has not computed it itself, it obtains it via the radio unit).

FIG. 1 schematically shows a network entity, a radio unit and a mobile terminal according to one embodiment of the invention.

In the example of FIG. 1, the mobile terminal 1 of a user 2 is in the radio coverage of two radio antennas 3.0 and 4.0.

The mobile terminal 1 receives the signals produced by the radio units (RU) 3.1 and 4.1 and transmitted by the antennas 3.0 and 4.0, respectively. The radio units 3.1 and 4.1 are each connected to a network entity 5.0. The links 3.2 and 4.2 between the network entity and the radio units 3.1 and 4.1 may be optical or even electrical links. In the 5G standard the network entity 5.0 is a distributed unit (DU). This network entity 5.0 sends, to the radio units 3.1 and 4.1, signals that the radio units 3.1 and 4.1 convert into electrical signals that induce radio signals via the antennas 3.0 and 4.0, and vice versa. The radio unit 3.1 and the network entity 5.0 may be co-located, the link between the radio unit and the network entity 5.0 then being short, a few meters for example. The network entity 5.0 may also be located at a distance from the radio unit 4.1, for example several kilometers or tens of kilometers therefrom.

In the example of FIG. 1, a single network entity 5.0 has been shown for the two radio units 3.1 and 4.1. However, each radio unit 3.1 and 4.1 may be served by a separate network entity and, although this is not shown in the figure, implementation of the invention in this case does not require any particular modification with respect to the implementation depicted in FIG. 1.

In the example of FIG. 1, a centralized unit (CU) 6 is also connected to the network entity 5.0. In the 5G standard, the separation of the functions of a base station means that it may consist of a centralized unit CU connected to one or more network entities DU, each DU being connected to one or more radio units RU.

The mobile terminal 1 is geolocated, inter alia, via a measurement relating to the trip time of transmission of signals, for example reference signals such as PRS, between the network entity 5.0 and the mobile terminal 1.

The mobile terminal 1 sends a PRS, denoted PRS1, to the network entity 5.0 via the radio unit 3.1 and another PRS, denoted PRS2, to the network entity 5.0 via the radio unit 4.1. More exactly, the mobile terminal 1 transmits a PRS radio signal, which is picked up both by the antenna 3.0 of the radio unit 3.1 and by the antenna 4.0 of the radio unit 4.1, after a priori different times of flight. Each radio unit then transmits the signal it received to the network entity 5.0.

The network entity 5.0 then measures the TOA (Time Of Arrival) of each of the PRS signals received. However, the TOAs (Times Of Arrival) obtained do not take into account the trip time of transmission of the signals PRS1 and PRS2 over the links 3.2 and 4.2, these not having the same transmission characteristics. The trip times of transmission of the signals PRS1 and PRS2 over the links 3.2 and 4.2, i.e. between the radio units 3.1 and 4.1 and the network entity 5.0, respectively, are denoted t3 and t4, respectively. The times t3 and t4 may be measured using dedicated signals S1 and S2 in the control plane, these dedicated signals being referred to as comparison signals. Alternatively, this measurement may also be made directly on the signals PRS1 and PRS2 by the network entity 5.0 when it receives them. In this case, the reference signals PRS1 and PRS2 also serve as comparison signals. In the prior art, the geolocation of the mobile terminal 1 is estimated based on a direct measurement of the difference between the trip times of transmission of PRS1 and PRS2, i.e. U-TDOA. However, this geolocation method is inaccurate because it does not take into account the difference between the times t3 and t4 in the computation of U-TDOA. Transmission of PRS1 and PRS2 with a view to determining U-TDOA is triggered by a request made to the geolocation server 7 (Geoloc) asking for the position of the mobile terminal 1. This position may be required by an application of the mobile terminal 1 or by a request external to the terminal, for example by an authority distinct from the operator, to geolocate a person, i.e. the user 2 of the mobile terminal 1.

The server 7 sends a request to the centralized unit 6 which controls the network entity 5.0 in order to obtain the data required to geolocate the mobile terminal 1. The centralized unit 6 then sends a command message to the network entity 5.0 to trigger transmission of PRS1 and PRS2.

According to one aspect of the invention, the radio units 3.1 and 4.1, when they receive PRS1 and PRS2, delay transmitting them on to the mobile terminal 1. The delay t34* applied is the same for all the radio units, and is computed with respect to the time at which the reference signals PRS1 and PRS2 were sent by the network entity. Thus, since the times t3 and t4 are constant and both have as value the value of the delay t34*, they no longer need to be measured. However, it may be necessary to occasionally verify that the value of the delay t34* remains much greater than the values of the times t3 and t4, by means of specific measurements that the network entity may perform. In contrast, the geolocation server 7 is able to obtain an accurate geolocation without knowing the times t3 and t4 or their difference.

FIG. 2 shows one example of implementation of the method for receiving an uplink reference signal, according to one embodiment of the invention.

In a step St1, the network entity 5.0 is parameterized, i.e. one or more values of the delay t34* are recorded in its memory. Specifically, different values may be used for each of the radio units 3.1 and 4.1.

In a step St2, the server 7 receives a geolocation request from the mobile terminal 1, for example, a request sent by a supervision entity further upstream in the network, or by an application in the mobile terminal 1.

In a step St3, the server 7 sends a TOA measurement request to the centralized unit 6.

In a step St4, the centralized unit 6 sends a message through a control channel to the network entity 5.0 to trigger the protocol for measuring the trip times of the PRS. The central unit may also send this message to other network entities to which other radio units (not illustrated) are connected.

In a step St5, the network entity 5.0 that received the message, commands the mobile terminal 1 to send the reference signals PRS1 and PRS2, PRS1 being sent to the network entity 5.0 via the radio unit 3.1 and PRS2 being sent to the mobile terminal 1 via the radio unit 4.1. The reference signals are timestamped at the time they are sent by the mobile terminal 1.

The network entity 5.0 also commands each of the radio units 3.1 and 4.1 to send, in the control plane, the comparison signals S1 and S2 to the network entity 5.0. The comparison signals are timestamped at the time they are sent by the radio units 3.1 and 4.1, respectively. In one variant, the reference signals serve as comparison signals and it is not necessary for the signals S1 and S2 to be sent. Below, for the sake of simplicity, when these comparison signals are referred to what is meant may either be signals that are distinct from or identical to the reference signals.

The reference signals PRS1, PRS2, and the comparison signals S1 and S2 may be sent periodically.

If the network entity 5.0 detects that the trip time of a comparison signal is greater than the time delay t34* thereof stored in step St1, then, in a step St5' (not illustrated in FIG. 2) the network entity 5.0 triggers a delay revision procedure, so that the value of the time delay may be revised upwards.

The method then stops, or returns to step St1.

In a step St6, the radio units 3.1 and 4.1 receive the signals PRS1 and PRS2 sent by the mobile terminal 1, assign them a timestamp of passage and send them on without delay to the network entity 5.0. The trip times between, on the one hand, the radio unit 3.1 and the radio unit 4.1 and, on the other hand, the network entity 5.0, are denoted t3 and t4, respectively.

In a step St7, the network entity 5.0 receives, at a priori different times, the signals PRS1 and PRS2 sent by the mobile terminal 1, through the radio units 3.1 and 4.1 respectively, after a priori different times of flight.

In a step St8, the network entity 5.0 modifies the reception time of a received reference signal (PRS1 or PRS2) by adding the delay t34* to the timestamp of passage of the reference signal through the radio unit, and saves the result as the TOA of the reference signal.

It will be understood that, by virtue of this operation, the duration of the non-air portion of a trip of a reference signal PRS is corrected so as to be equal to the time delay t34*.

In a step St10, the network entity 5.0 sends, to the server 7, the TOAs of the reference signals PRS1 and PRS2. Thus, the server 7 may determine U-TDOA, the difference between the trip times of these reference signals.

In a step St11, the network entity 5.0 sends to the server 7 the one or more time delays t34* corresponding to the TOAs, optionally at the request of the server 7. Thus, the server 7 may determine the times of flight of the reference signals PRS1 and PRS2, on the basis of the TOAs and of the one or more time delays t34*. The server 7 may thus correct the U-TDOA, when the time delays t34* are not of identical value for all the reference signals. The server 7 may then determine an accurate position for the mobile terminal 1 on the basis of the times of flight (over the air) of the signals PRS1 and PRS2, and optionally on the basis of other measurements of time of flight obtained separately from one or more other network entities and other radio units connected to other antennas.

There is a maximum time limit between a network entity and a radio unit. Specifically, the network entity constantly computes a parameter called "timing advance" with each of the radio units, to synchronize the information sent and received. This time computation must stay below a limit to maintain effective communication (typically <1 ms). The time delay t34* must therefore be set to maintain a time margin in the total propagation time between network entity and mobile terminal. However, it is not advisable to set t34* arbitrarily at 500 μs to cover all cases. For example, the time delay t34* between the radio unit 3.1 and the network entity 5.0 may be set to a value 10% greater than the time t3.

FIG. 3 shows one example of a structure of a device for receiving an uplink reference signal, according to one aspect of the invention.

The receiving device 100 implements the method for receiving an uplink reference signal, various embodiments of which have just been described.

Such a device 100 may be implemented in a network entity DU.

For example, the device 100 comprises a receiver 101, a transmitter 102, and a processing unit 130, which is for example equipped with a microprocessor μP and controlled by a computer program 110, which is stored in a memory 120 and implements the method for receiving an uplink reference signal according to the invention. On initialization, the code instructions of the computer program 110 are for example loaded into a RAM memory, before being executed by the processor of the processing unit 130.

Such a memory 120, such a processor of the processing unit 130, such a receiver 101 and such a transmitter 102 are able and configured to:

record, as the time of arrival of a reference signal, a time obtained by adding a delay, referred to as the time delay, to the time at which the reference signal was sent by a radio unit RU, the time delay being of a value greater than a trip time of transmission of a signal, referred to as the comparison signal, between the radio unit RU and a network entity DU comprising the device 100, and send, to a geolocation server Geoloc, a message containing information relating to the recorded time of arrival.

Advantageously, they are also able and configured to:

measure a value of the trip time of transmission of the comparison signal, send, to the radio unit RU, a request for transmission of the comparison signal, receive a message containing the value of the time delay, and determine the value of the time delay depending on the measured value of the trip time of the comparison signal.

The described entities included in the device described with reference to FIG. 3 may be hardware or software entities. FIG. 3 illustrates just one particular way from among several possible ones of implementing the algorithm described above with reference to FIGS. 1 and 2. Specifically, the technique of the invention may be carried out equally well on a reprogrammable computing machine (a PC, a DSP or a microcontroller) executing a program comprising a sequence of instructions, as on a dedicated computing machine (for example a set of logic gates such as an FPGA or an ASIC, or any other hardware module). If the invention is installed on a reprogrammable computing machine, the corresponding program (that is to say the sequence of instructions) will possibly be stored on a removable storage medium (such as for example a USB stick, a floppy disk, a CD-ROM or a DVD-ROM) or a non-removable storage medium, this storage medium being partially or completely readable by a computer or a processor.

Although the present disclosure has been described with reference to one or more examples, workers skilled in the art will recognize that changes may be made in form and detail without departing from the scope of the disclosure and/or the appended claims.

The invention claimed is:

1. A method implemented by a network entity and comprising:

receiving an uplink reference signal sent by a mobile terminal to the network entity through a radio unit connected to an antenna, said signal being used for geolocation of the mobile terminal;

recording, as a time of arrival of the reference signal, a time obtained by adding a delay, referred to as a time delay, to a time at which the reference signal was sent by the radio unit, the time delay being of a value greater than a trip time of transmission of a signal, referred to as a comparison signal, between the radio unit and the network entity; and sending, to a geolocation server, a message containing information relating to the recorded time of arrival.

2. The method as claimed in claim 1, comprising measuring a value of the trip time of transmission of the comparison signal.

3. The method as claimed in claim 2, comprising determining the value of the time delay depending on the measured value of the trip time of the comparison signal, and wherein the message sent to the geolocation server contains the determined value of the time delay.

4. The method as claimed in claim 1, wherein the comparison signal is the reference signal.

5. The method as claimed in claim 1, wherein the comparison signal is a signal distinct from the reference signal.

6. The method as claimed in claim 1, comprising sending, to the radio unit, a request for transmission of the comparison signal.

7. The method as claimed in claim 1, comprising the network entity receiving a message containing the value of the time delay from another entity of the network.

8. The method as claimed in claim 1, wherein the message sent to the geolocation server comprises the recorded time of arrival.

9. A device of a network entity, comprising:

a receiver, a transmitter, a processor and a memory coupled to the processor with instructions stored thereon to be executed by the processor to:

receive an uplink reference signal sent by a mobile terminal to the network entity through a radio unit connected to an antenna, said signal being used for geolocation of the mobile terminal;

record, as a time of arrival of the reference signal, a time obtained by adding a delay, referred to as a time delay, to a time at which the reference signal was sent by the radio unit, the time delay being of a value greater than a trip time of transmission of a signal, referred to as a comparison signal, between the radio unit and the network entity; and send, to a geolocation server, a message containing information relating to the recorded time of arrival.

10. A non-transitory computer readable data medium comprising instructions of a computer program stored thereon which when executed by a network entity of a cellular network configure the network entity to:

receive an uplink reference signal sent by a mobile terminal to the network entity through a radio unit connected to an antenna, said signal being used for geolocation of the mobile terminal;

record, as a time of arrival of the reference signal, a time obtained by adding a delay, referred to as a time delay, to a time at which the reference signal was sent by the radio unit, the time delay being of a value greater than a trip time of transmission of a signal, referred to as a comparison signal, between the radio unit and the network entity; and send, to a geolocation server, a message containing information relating to the recorded time of arrival.

* * * * *